United States Patent [19]
Chi

[11] Patent Number: 5,509,739
[45] Date of Patent: Apr. 23, 1996

[54] BOTTOM BRACKET ASSEMBLY

[76] Inventor: Yi C. Chi, No. 139-5, An Mei Rd., Mei Shan Village, Hou Li Hsiang, Taichung Hsien, Taiwan

[21] Appl. No.: 388,512

[22] Filed: Feb. 14, 1995

[51] Int. Cl.⁶ .................................................. F16C 19/08
[52] U.S. Cl. ........................................... 384/458; 384/545
[58] Field of Search .................................. 384/458, 545, 384/542, 538, 540; 74/594.1

[56] References Cited

U.S. PATENT DOCUMENTS

| | | | |
|---|---|---|---|
| 3,578,829 | 5/1971 | Hata | 384/458 |
| 4,807,491 | 2/1989 | Stuckenbrok | 74/594.1 |
| 4,961,654 | 10/1990 | Pangburn et al. | 384/542 |
| 5,118,205 | 6/1992 | Hoffmann | 384/545 |

*Primary Examiner*—Lenard A. Footland
*Attorney, Agent, or Firm*—Bacon & Thomas

[57] ABSTRACT

A bottom bracket assembly includes a bottom bracket, a first bowl member having an outer threaded portion for engagement in an inner threaded portion of the bottom bracket, a flange portion formed on a distal end of the first bowl member, a second bowl member having an outer threaded portion for engagement in an inner threaded portion of the bottom bracket, a tube fixedly mounted in the bottom bracket and including a first end having an outer threaded portion for engagement in an inner threaded portion of the first bowl member and a second end having a tapered surface for urging on a tapered surface of the second bowl member, a second flange portion formed on the first end of the tube for abutting against the flange portion of the first bowl member, an axle rotatably mounted in the tube, a first ball bearing rotatably mounted between an annular recess of the first bowl member and an annular recess of the axle, and a second ball bearing rotatably mounted between an annular recess of the tube and an annular recess of the axle.

2 Claims, 2 Drawing Sheets

5,509,739

BOTTOM BRACKET ASSEMBLY

BACKGROUND OF THE INVENTION

1. Field of Invention

The present invention relates to a bottom bracket assembly.

2. Related Prior Art

A conventional bottom bracket assembly is shown in FIG. 2. However, by such an arrangement, there are still some shortcomings in the conventional bottom bracket assembly.

There will be a more complete and sufficient illustration in the detailed description of the preferred embodiments, concerning the conventional bottom bracket assembly.

The present invention has arisen to mitigate and/or obviate the disadvantages of the conventional bottom bracket assembly.

SUMMARY OF THE INVENTION

The primary objective of the present invention is to provide a bottom bracket assembly which is easily assembled by using a few assembly parts.

In accordance with one aspect of the present invention, there is provided a bottom bracket assembly comprising a bottom bracket including a first end portion and a second end portion each having a threaded portion formed along an inner periphery thereof. A first bowl member comprises a first outer threaded portion formed along an outer periphery thereof for engagement in the threaded portion of the first end portion of the bottom bracket, an inner threaded portion is formed along an inner periphery of the first bowl member, a first annular recess is defined in the inner periphery of the first bowl member, and a first flange portion is formed on a distal end of the first bowl member. A second bowl member comprises a second outer threaded portion formed along an outer periphery thereof for engagement in the threaded portion of the second end portion of the bottom bracket, and a first tapered surface is formed along an inner periphery of the second bowl member. A tube is fixedly mounted in the bottom bracket and comprises a first end having a third outer threaded portion formed along an outer periphery thereof for engagement in the inner threaded portion of the first bowl member and a second end having a second tapered surface formed along an outer periphery thereof for urging on the first tapered surface of the second bowl member, a second annular recess is defined in an inner periphery of the second end of the tube, and a second flange portion is formed on the first end of the tube for abutting against the first flange portion of the first bowl member. An axle is rotatably mounted in the tube and comprises a first end portion having a third annular recess defined in an outer periphery thereof and a second end portion having a fourth annular recess defined in an outer periphery thereof. A first ball bearing is rotatably mounted between the first annular recess of the first bowl member and the third annular recess of the axle, and a second ball bearing is rotatably mounted between the second annular recess of the tube and the fourth annular recess of the axle.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 2:
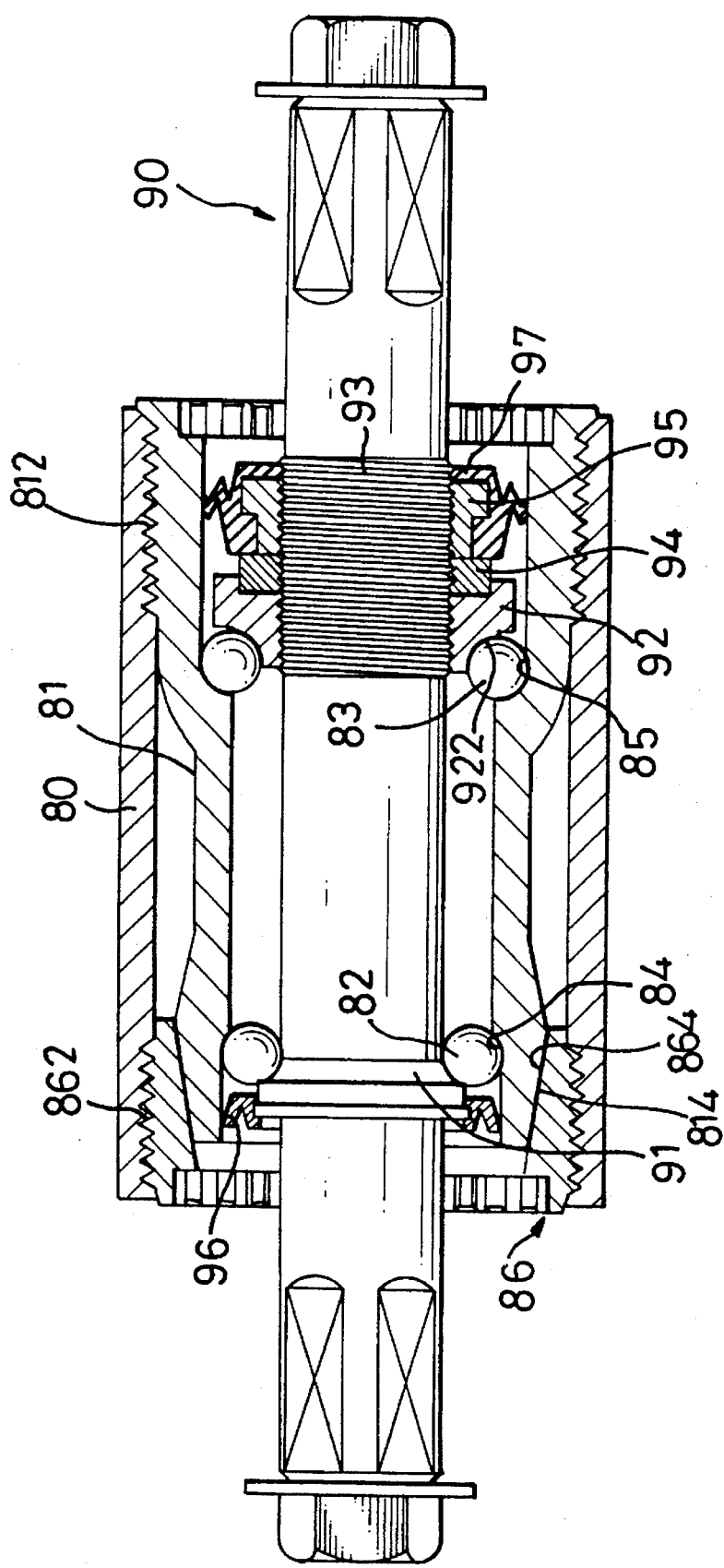
FIG. 2 is an front plan partially cross-sectional view of a conventional bottom bracket assembly in accordance with the prior art.

Referring to FIG. 2, a conventional bottom bracket assembly in accordance with the prior art comprises a bottom bracket 80 including a first end portion and a second end portion each having an inner threaded portion (not labeled) formed along an inner periphery thereof. A tube 81 is mounted in the bottom bracket 80 and includes a first end having an outer threaded portion 812 formed along an outer periphery thereof for engagement in the inner threaded portion of the first end portion of the bottom bracket 80, and a second end having a tapered surface 814 formed along an outer periphery thereof, and a first annular recess 85 and a second annular recess 84 are respectively defined in an inner periphery of the first and second ends of the tube 81. A bowl member 86 includes an outer threaded portion 862 formed along an outer periphery thereof for engagement in the inner threaded portion of the second end portion of the bottom bracket 80, and a tapered surface 864 formed along an inner periphery thereof for urging on the tapered surface 814 of the tube 81.

An axle 90 is rotatably mounted in the tube 81 and includes a first end portion having an outer threaded portion 93 formed along an outer periphery thereof, and a second end portion having third annular recess 91 defined in an outer periphery thereof. A race 92 is threadedly mounted around the outer threaded portion 93 of the axle 90 and has a fourth annular recess 922 defined in an outer periphery thereof. A nut 95 is threadedly mounted around the outer threaded portion 93 of the axle 90 for urging on the race 92 and a washer 94 is mounted therebetween. A first ball bearing 83 is rotatably mounted between the first annular recess 85 of the tube 81 and the fourth annular recess 922 of the race 92 and a second ball bearing 82 is rotatably mounted between the second annular recess 84 of the tube 81 and the third annular recess 91 of the axle 90. Preferably, a first waterproof gasket 97 is mounted around the nut 95 and engaged in the first end of the tube 81, and a second waterproof gasket 96 is mounted around the second end portion of the axle 90 and engaged in the second end of the tube 81.

By such an arrangement, the first and second ball bearings 83 and 82 have to be respectively urged by the race 92 and the bowl member 86 synchronously such that a force exerted on the first ball bearing 83 by the race 92 must be equal to that exerted on the second ball bearing 82 by the bowl member 86, thereby accomplishing a structural coupling stably. If the two forces are not balanced, the ball bearings 83 and 82 are easily worn out, so greatly causing time-consuming adjustment of the forces exerted by the race 92 and the bowl member 86 respectively on the first and second ball bearings 83 and 82. In addition, the bottom bracket assembly requires a lot of parts for assembling, so causing a great cost in manufacturing.

Figure 1:
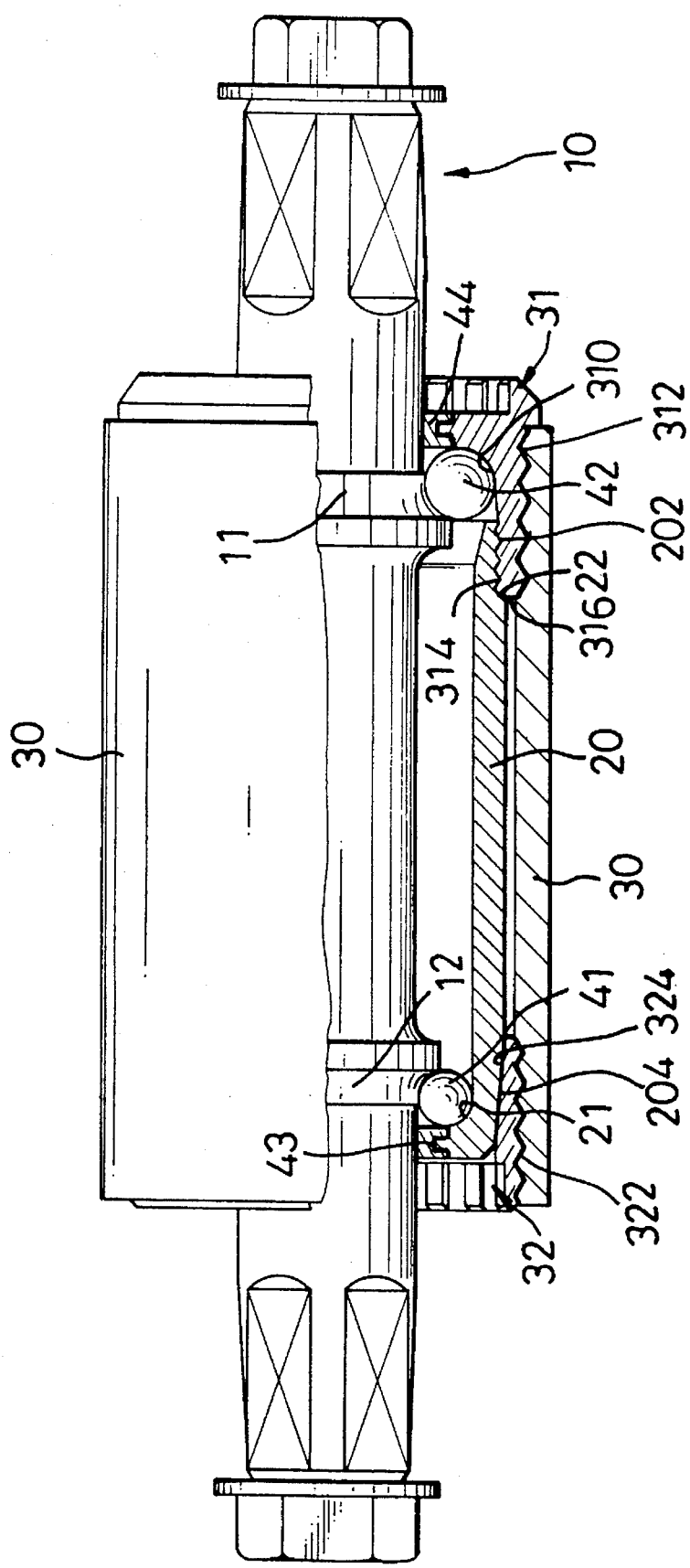
FIG. 1 is a front plan partially cross-sectional view of a bottom bracket assembly in accordance with the present invention.

Referring to FIG. 1, a bottom bracket assembly in accordance with the present invention comprises a bottom bracket 30 including a first end portion and a second end portion each having a threaded portion (not labeled) formed along an inner periphery thereof. A first bowl member 31 has a first outer threaded portion 312 formed along an outer periphery thereof for engagement in the threaded portion of the first end portion of the bottom bracket 30, an inner threaded portion 314 is formed along an inner periphery of the first bowl member 31, a first annular recess 310 is defined in the inner periphery of the first bowl member 31, and a first flange portion 316 is formed on a distal end of the first bowl member 31. A second bowl member 32 has a second outer threaded portion 322 formed along an outer periphery thereof for engagement in the threaded portion of the second end portion of the bottom bracket 30, and a first tapered surface 204 is formed along an inner periphery of the second bowl member 32. A tube 20 is fixedly mounted in the bottom bracket 30 and comprises a first end having a third outer threaded portion 202 formed along an outer periphery thereof for engagement in the inner threaded portion 314 of the first bowl member 31 and a second end having a second tapered surface 324 formed along an outer periphery thereof for urging on the first tapered surface 204 of the second bowl member 32, a second annular recess 21 is defined in an inner periphery of the second end of the tube 20, and a second flange portion 22 is formed on the first end of the tube 20 for abutting against the first flange portion 316 of the first bowl member 31. An axle 10 is rotatably mounted in the tube 20 and comprises a first end portion having a third annular recess 11 defined in an outer periphery thereof and a second end portion having a fourth annular recess 12 defined in an outer periphery thereof. A first ball bearing 42 is rotatably mounted between the first annular recess 310 of the first bowl member 31 and the third annular recess 11 of the axle 10, and a second ball bearing 41 is rotatably mounted between the second annular recess 21 of the tube 20 and the fourth annular recess 12 of the axle 10.

Preferably, the bottom bracket assembly further comprises a first washer 44 mounted around the first end portion of the axle 10 and engaged in the first bowl member 31 for water-proofing, and comprises a second washer 43 mounted around the second end portion of the axle 10 and engaged in the second end of the tube 20 for water-proofing.

Accordingly, by such an arrangement, the first flange portion 316 of the first bowl member 31 is abutted against the second flange portion 22 of the tube 20 and the tapered surface 324 of the second bowl member 32 is securely urged on the tapered surface 204 of the tube 20 so as to exert a radial and axial force on the tube 20, which is subsequently transmitted to the axle 10, thereby easily positioning the axle 10 in the bottom bracket 30. In addition, the bottom bracket assembly has a stable structure with fewer assembly parts which are easily assembled and dismantled by a user, thereby greatly decreasing cost in fabrication and assembly.

It should be clear to those skilled in the art that further embodiments of the present invention may be made without departing from the teachings of the present invention.

What is claimed is:

1. A bottom bracket assembly comprising:

a bottom bracket (30) comprising a first end portion and a second end portion each having a threaded portion formed along an inner periphery thereof;

a first bowl member (31) having a first outer threaded portion (312) formed along an outer periphery thereof for engagement in said threaded portion of said first end portion of said bottom bracket (30), an inner threaded portion (314) formed along an inner periphery of said first bowl member (31), a first annular recess (310) defined in the inner periphery of said first bowl member (31), and a first flange portion (316) formed on a distal end of said first bowl member (31);

a second bowl member (32) having a second outer threaded portion (322) formed along an outer periphery thereof for engagement in said threaded portion of said second end portion of said bottom bracket (30), and a first tapered surface (204) formed along an inner periphery of said second bowl member (32);

a tube (20) fixedly mounted in said bottom bracket (30) and comprising a first end having a third outer threaded portion (202) formed along an outer periphery thereof for engagement in said inner threaded portion (314) of said first bowl member (31) and a second end having a second tapered surface (324) formed along an outer periphery thereof for urging on said first tapered surface (204) of said second bowl member (32), a second annular recess (21) defined in an inner periphery of said second end of said tube (20), and a second flange portion (22) formed on said first end of said tube (20) for abutting against said first flange portion (316) of said first bowl member (31);

an axle (10) rotatably mounted in said tube (20) and comprising a first end portion having a third annular recess (11) defined in an outer periphery thereof and a second end portion having a fourth annular recess (12) defined in an outer periphery thereof; and a first ball bearing (42) rotatably mounted between said first annular recess (310) of said first bowl member (31) and said third annular recess (11) of said axle (10), and a second ball bearing (41) rotatably mounted between said second annular recess (21) of said tube (20) and said fourth annular recess (12) of said axle (10).

2. The bottom bracket assembly in accordance with claim 1, further comprising a first washer (44) mounted around said first end portion of said axle (10) and engaged in said first bowl member (31) for water-proofing, and a second washer (43) mounted around said second end portion of said axle (10) and engaged in said second end of said tube (20) for water-proofing.

\* \* \* \* \*